(12) United States Patent
Nagura et al.

(10) Patent No.: US 9,573,493 B2
(45) Date of Patent: Feb. 21, 2017

(54) SEAT RECLINING DEVICE

(71) Applicant: AISIN SEIKI KABUSHIKI KAISHA, Kariya-shi (JP)

(72) Inventors: Mikihito Nagura, Okazaki (JP); Atsushi Abaka, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 14/626,132

(22) Filed: Feb. 19, 2015

(65) Prior Publication Data

US 2015/0239371 A1    Aug. 27, 2015

(30) Foreign Application Priority Data

Feb. 24, 2014  (JP) ................................. 2014-033327

(51) Int. Cl.
*B60N 2/22* (2006.01)
*B60N 2/235* (2006.01)
*B60N 2/12* (2006.01)

(52) U.S. Cl.
CPC ............... *B60N 2/2236* (2013.01); *B60N 2/12* (2013.01); *B60N 2/2356* (2013.01)

(58) Field of Classification Search
CPC ........ B60N 2/2356; B60N 2/2236; B60N 2/12
USPC ..................................................... 297/367 P
See application file for complete search history.

(56) References Cited

U.S. PATENT DOCUMENTS

| 2008/0203799 A1* | 8/2008 | Yamada ............... B60N 2/2356 297/367 R |
| 2009/0250990 A1* | 10/2009 | Endo et al. ............... 297/367 P |
| 2013/0113261 A1 | 5/2013 | Mikasa et al. |
| 2013/0264858 A1* | 10/2013 | Ootaki ....................... 297/463.1 |

FOREIGN PATENT DOCUMENTS

| DE | 20 2010 015 171 U1 | 3/2011 |
| DE | 10 2012 005 697 A1 | 9/2012 |
| FR | 2 920 713 A1 | 3/2009 |
| JP | 2013-100021 | 5/2013 |
| JP | 2013-129358 | 7/2013 |
| JP | 2013-215269 | 10/2013 |
| WO | WO 2008/046004 A1 | 4/2008 |
| WO | WO 2011/160771 A1 | 12/2011 |

OTHER PUBLICATIONS

Extended European Search Report issued Jul. 10, 2015 in Patent Application No. 15155853.3.

* cited by examiner

*Primary Examiner* — Milton Nelson, Jr.
(74) *Attorney, Agent, or Firm* — Oblon, McClelland, Maier & Neustadt, L.L.P.

(57) ABSTRACT

A seat reclining device includes: a first bracket including an accommodating portion being open to an outer side of a seat in a width direction; a second bracket rotating with respect to the first bracket; a cam rotating with respect to the first bracket; a spring accommodated in the accommodating portion and biasing the cam; a pawl moved in a radial direction of the first bracket based on the rotation of the cam and engaged with the second bracket; and a cover covering the spring, wherein the cover is mounted on the accommodating portion and an outer surface of the cover on the outer side corresponds to an outer surface of the first bracket on the outer side or is positioned inside the outer surface of the first bracket in the width direction of the seat.

9 Claims, 9 Drawing Sheets

SEAT RECLINING DEVICE

CROSS REFERENCE TO RELATED APPLICATIONS

This application is based on and claims priority under 35 U.S.C. §119 to Japanese Patent Application 2014-033327, filed on Feb. 24, 2014, the entire contents of which are incorporated herein by reference.

TECHNICAL FIELD

This disclosure relates to a seat reclining device.

BACKGROUND DISCUSSION

A device that is described in, for example, JP 2013-100021A (Reference 1) is known as a seat reclining device for maintaining a seat back at a predetermined angle with respect to a seat cushion of a seat.

The seat reclining device is provided with a first bracket that is mounted on the seat cushion, a cam that rotates with respect to the first bracket, a pawl that is moved in a radial direction of the first bracket by the rotation of the cam, and a second bracket that is mounted on the seat back and rotates with respect to the first bracket. The pawl is moved outwardly by the rotation of the cam and external teeth of the pawl are engaged with internal teeth that are disposed on an outer circumferential wall of the second bracket so that the rotation of the second bracket is blocked. In this manner, the second bracket is maintained at a predetermined angle with respect to the first bracket.

In addition, the cam is biased, by a spiral spring, in a predetermined direction of rotation so that the engagement between the external teeth of the pawl and the internal teeth of the second bracket is maintained. The spiral spring is, for example, accommodated in an accommodating portion that is disposed in the first bracket.

In Reference 1, the accommodating portion is open to an outer side. Accordingly, dust or the like may infiltrate into the accommodating portion. Regarding this point, techniques for covering the spiral spring by using a cover have been known (refer to JP 2013-215269A (Reference 2)).

In the case of Reference 2, however, the cover is mounted outside the first bracket, and thus it is difficult to mount the first bracket on a fixing member (for example, a frame that constitutes the seat cushion).

SUMMARY

Thus, a need exists for a seat reclining device which is not suspectable to the drawback mentioned above.

A seat reclining device according to an aspect of this disclosure includes a first bracket that has an accommodating portion which is open to an outer side of a seat in a width direction, a second bracket that rotates with respect to the first bracket, a cam that rotates with respect to the first bracket, a spring that is accommodated in the accommodating portion of the first bracket and biases the cam, a pawl that is moved in a radial direction of the first bracket based on the rotation of the cam and is engaged with the second bracket, and a cover that covers the spring, in which the cover is mounted on the accommodating portion and an outer surface of the cover on the outer side of the seat in the width direction corresponds to an outer surface of the first bracket on the outer side of the seat in the width direction or is positioned inside the outer surface of the first bracket in the width direction of the seat.

BRIEF DESCRIPTION OF THE DRAWINGS

The foregoing and additional features and characteristics of this disclosure will become more apparent from the following detailed description considered with the reference to the accompanying drawings, wherein:

FIGS. 7A to 7C are schematic cross-sectional diagrams taken along line VII-VII in FIG. 2.

DETAILED DESCRIPTION

A seat reclining device according to an embodiment will be described with reference to FIGS. 1 to 8.

Figure 1:
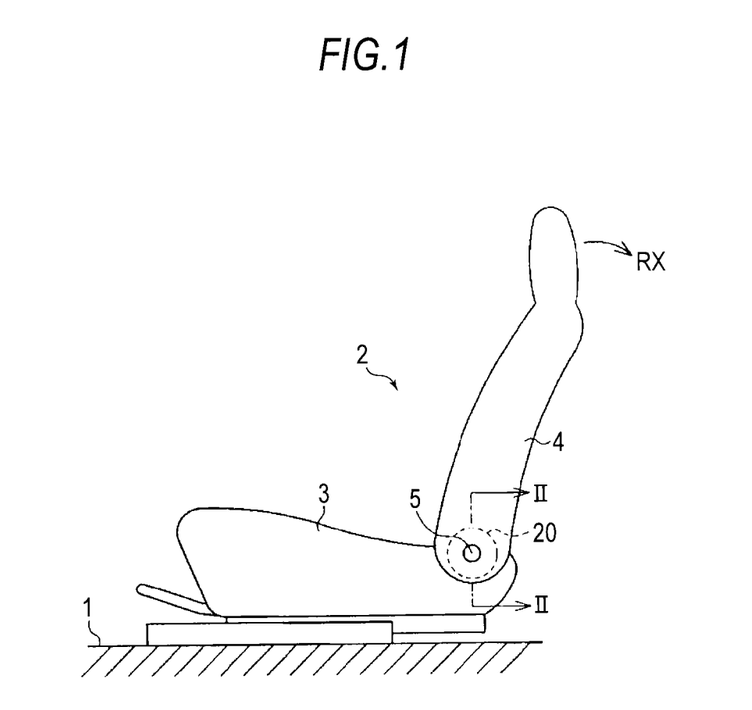
FIG. 1 is a side view of a seat that is provided with a seat reclining device.

As illustrated in FIG. 1, a seat reclining device 20 is applied to a seat 2 that is disposed on a vehicle floor 1 or the like. The seat 2 relating to this application is provided with, for example, a seat cushion 3 that constitutes a seat surface and a seat back 4 that constitutes a backrest. The seat back 4 is rotatable and can be maintained at a predetermined angle with respect to the seat cushion 3.

The seat back 4 is mounted on the seat cushion 3 via the seat reclining device 20. The seat reclining device 20 maintains the seat back 4 at a predetermined angle with respect to the seat cushion 3.

Figure 2:
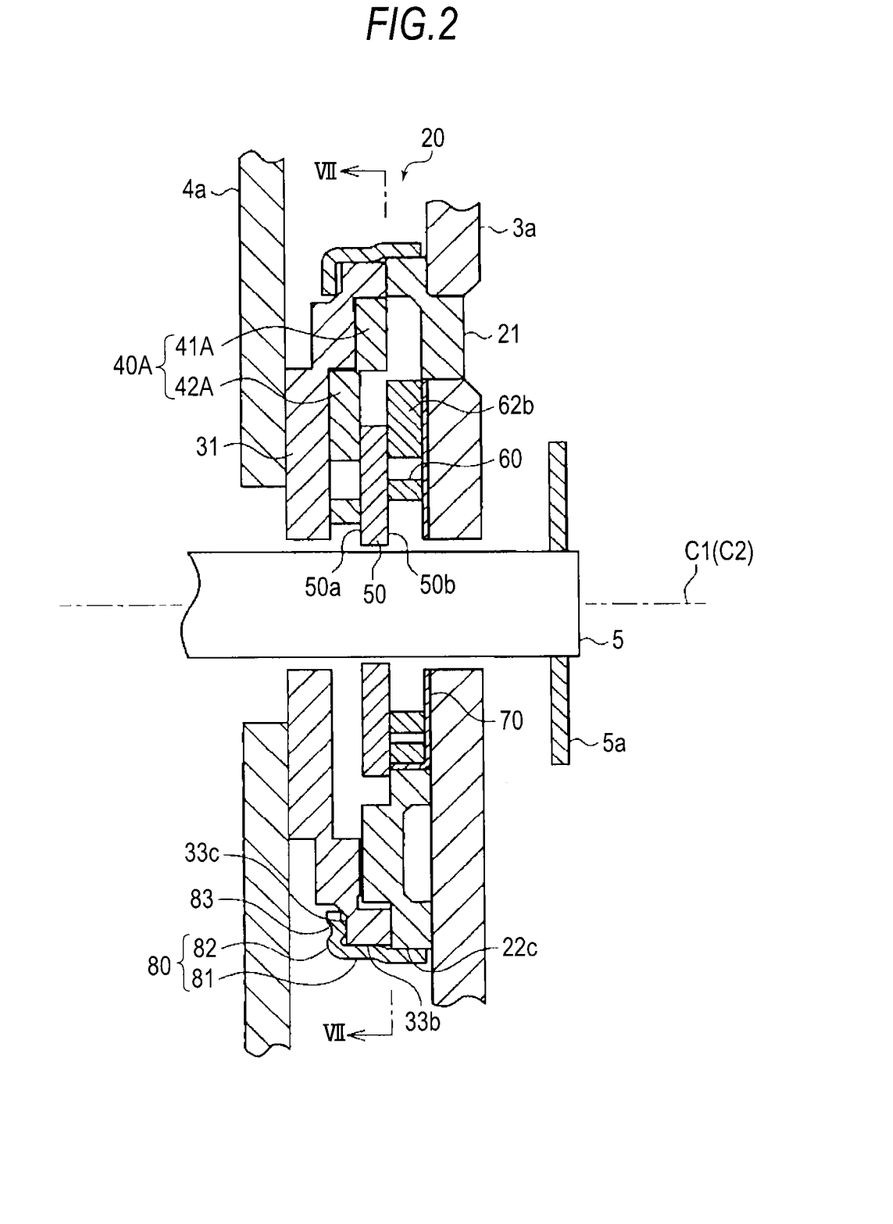
FIG. 2 is a cross-sectional view of the seat reclining device taken along line II-II in FIG. 1.

As illustrated in FIG. 2, one of rotating bodies (one of first and second brackets 21 and 31 (described later)) of the seat reclining device 20 is fixed to a plate 3a that is mounted on the seat cushion 3. The other rotating body (the other one of the first and second brackets 21 and 31 (described later)) of the seat reclining device 20 is fixed to a plate 4a that is mounted on the seat back 4. In the following description of this embodiment, the first bracket 21 is fixed to the plate 3a on the seat cushion 3 side and the second bracket 31 is fixed to the plate 4a on the seat back 4 side as illustrated in FIG. 2.

In addition, a shaft 5 penetrates a central portion of the seat reclining device 20. The shaft 5 operates a cam mechanism that is disposed in the seat reclining device 20. An operation lever 5a for rotating the shaft 5 is mounted on an end portion of the shaft 5.

In a state where the seat reclining device 20 is mounted on the seat 2, an axis of rotation C1 of the shaft 5 and an axis of rotation C2 of the seat reclining device 20 (axes of rotation of the first bracket 21 and the second bracket 31) correspond to each other.

In the following description, a direction along a circumference whose central axis is the axis of rotation C2 of the seat reclining device 20 will be referred to as a circumferential direction and a direction (normal direction) that is perpendicular to the axis of rotation C2 will be referred to as a radial direction. In addition, a direction in which the second bracket 31 rotates as a result of backward falling of the seat back 4 will be referred to as a rear rotation direction RX.

A configuration of the seat reclining device 20 will be described with reference to FIG. 3.

Figure 3:
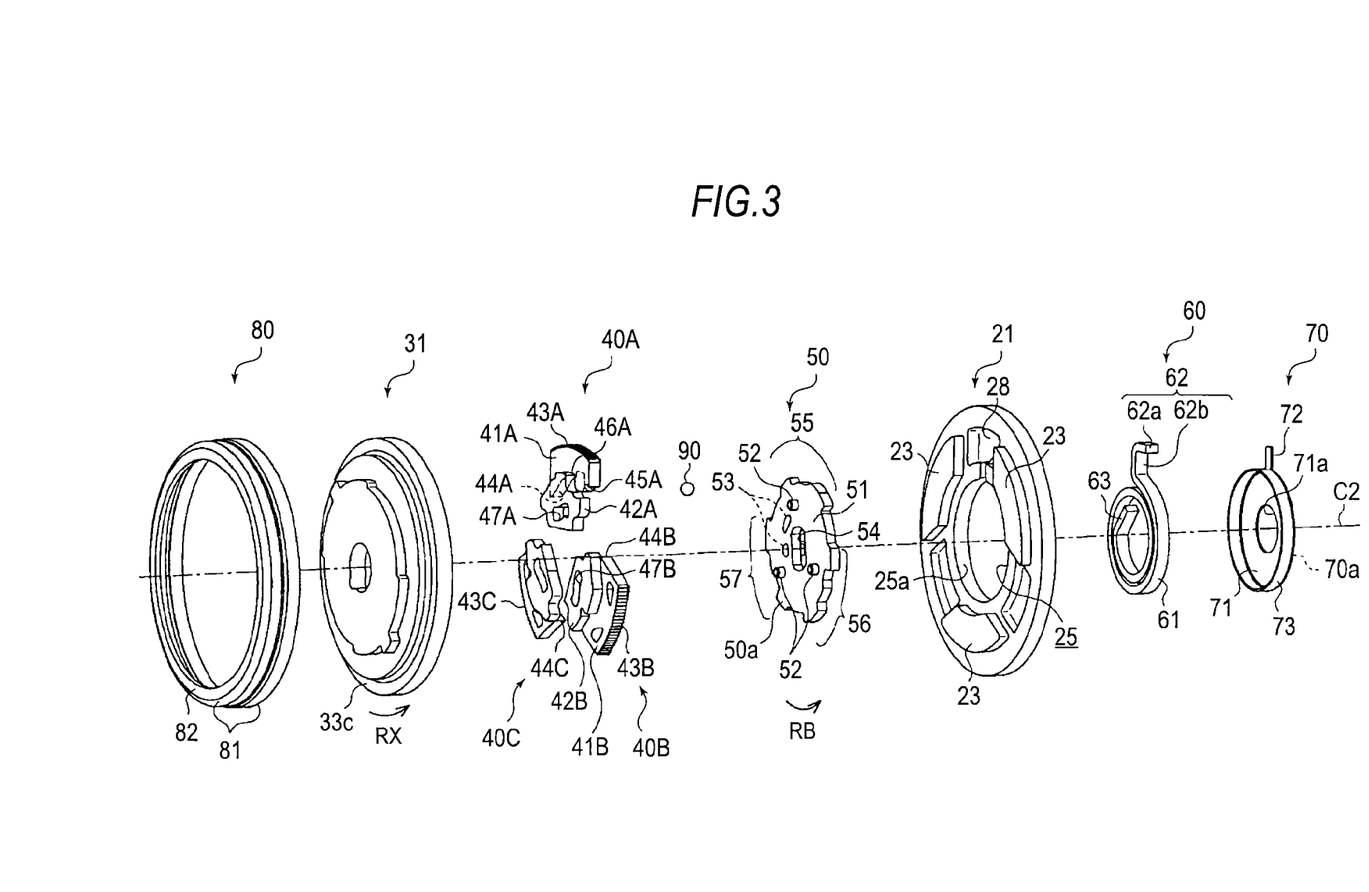
FIG. 3 is an exploded perspective view of the seat reclining device.

As illustrated in FIG. 3, the seat reclining device 20 is provided with the first bracket 21, the second bracket 31, first to third pawls 40A to 40C, a cam 50, a spiral spring 60 that biases the cam 50, a cover 70 that covers the spiral spring 60, and a holding member 80 that holds the first and second brackets 21 and 31. In addition, the seat reclining device 20 is provided with a ball cam 90 for suppressing an extra movement of the first pawl 40A. The cam 50, the spiral spring 60, the first to third pawls 40A to 40C, and the ball cam 90 constitute the cam mechanism that is described above.

The cam 50 is arranged between the first and second brackets 21 and 31 (refer to FIG. 2).

The cam 50 has a cam main body portion 51, three pawl engagement portions 52, and two spring engagement portions 53 that are engaged with an inner engagement portion 63 (refer to FIG. 3) of the spiral spring 60. The three pawl engagement portions 52 are respectively engaged with the first to third pawls 40A to 40C. The pawl engagement portions 52 are disposed on one surface (first surface 50a) of the cam 50. The spring engagement portions 53 are disposed on the other surface (second surface 50b (refer to FIG. 2)) of the cam 50.

A fitting hole 54 into which the shaft 5 is fitted is disposed in a central portion of the cam main body portion 51. The cam 50 rotates in response to the rotation of the shaft 5. Specifically, the cam 50 rotates when the operation lever 5a that is mounted on the shaft 5 is operated.

Three cam portions (hereinafter, referred to as a "first cam portion 55", a "second cam portion 56", and a "third cam portion 57") that abut against cam surfaces 44A to 44C of the respective pawls 40A to 40C are disposed at equal angular intervals on a circumferential surface of the cam main body portion 51.

The cam 50 is biased, by the spiral spring 60, in a predetermined direction of rotation (hereinafter, this direction will be referred to as a "biasing direction RB") with respect to the first bracket 21. In other words, a biasing force for rotation in the biasing direction RB is applied to the cam 50.

The first pawl 40A is provided with a first block 41A and a second block 42A that are arranged at different levels. The first block 41A is arranged radially outward and the second block 42A is arranged radially inward.

A radially outward end face (end face facing internal teeth 37 of the second bracket 31) of the first block 41A is configured to have an arc shape. External teeth 43A that are engaged with the internal teeth 37 of the second bracket 31 are formed on the radially outward end face.

The first cam surface 44A against which the first cam portion 55 of the cam 50 abuts is formed at a radially inward end (end face on the side opposite to the radially outward end face) of the first block 41A.

In addition, a concave curved surface portion 45A for accommodating the ball cam 90 is disposed, continuously from the first cam surface 44A, at the radially inward end of the first block 41A. The ball cam 90 is accommodated in a ball cam accommodating chamber S (refer to FIG. 7A) that is configured to have the concave curved surface portion 45A of the first pawl 40A, the first cam portion 55 of the cam 50, and guide surfaces 24 of guide sections 23.

The second block 42A is arranged on the first surface 50a side of the cam 50. In other words, the second block 42A is arranged more on the second bracket 31 side than the cam 50 is in a direction along the axis of rotation C2 (refer to FIG. 2). Also, the second block 42A is arranged for a radially outward end face of the second block 42A to face an outer circumferential portion 35 or an inner circumferential portion 36 of the second bracket 31 (refer to FIGS. 6A and 6B).

A limiting unit 46A that abuts against the inner circumferential portion 36 of the second bracket 31 and limits an outward movement of the first pawl 40A is disposed on the radially outward end face of the second block 42A. In addition, a cam hole 47A is disposed in a central portion of the second block 42A to penetrate the central portion of the second block 42A in a thickness direction.

The second pawl 40B has substantially the same structure as the first pawl 40A.

As is the case with the first pawl 40A, the second pawl 40B is provided with a first block 41B that has external teeth 43B and the second cam surface 44B and a second block 42B that has a cam hole 47B. However, a radially outward end face of the second block 42B does not have any structure corresponding to the limiting unit 46A. The third pawl 40C has the same structure as the second pawl 40B.

The spiral spring 60 has a spiral portion 61, an outer engagement portion 62 that is an outer end of the spiral portion 61, and the inner engagement portion 63 that is an inner end of the spiral portion 61.

Specifically, the spiral spring 60 is formed by winding a metal wire into a spiral shape. A spiral-shaped part of the metal wire corresponds to the spiral portion 61, an outer end of the metal wire corresponds to the outer engagement portion 62, and an inner end of the metal wire corresponds to the inner engagement portion 63. The outer engagement portion 62 has an extending portion 62b that extends in a radial direction of the spiral shape and an end portion 62a that is bent at a right angle to the extending portion 62b. The outer engagement portion 62 is engaged with the first bracket 21. The inner engagement portion 63 is engaged with the spring engagement portions 53 of the cam 50.

The thickness of the spiral spring 60 (dimension along a central axis of the spring) is smaller than the thickness of a main body portion 22 of the first bracket 21 (dimension along the axis of rotation C2). Specifically, the thickness dimension of the spiral spring 60 is equal to or smaller than the dimension that is obtained by subtracting the plate thickness dimension of a cover main body portion 71 from the thickness dimension of the main body portion 22 of the first bracket 21. Accordingly, the cover 70 can be mounted on the first bracket 21 for an outer surface 70a of the cover 70 to correspond to an outer surface 22b of the first bracket 21 or to be positioned inside the outer surface 22b of the first bracket 21 (inside along the axis of rotation C2) in the axis of rotation C2 direction.

The first bracket 21 will be described with reference to FIGS. 4A and 4B.

Figure 4A:
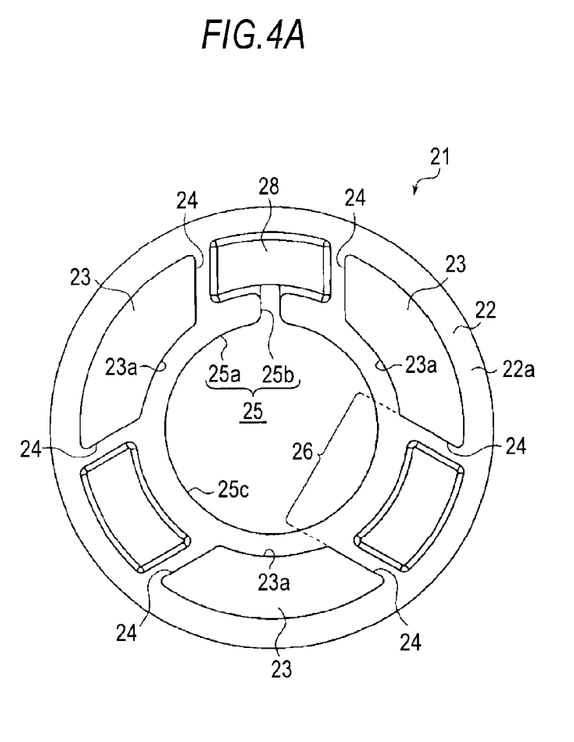
FIG. 4A is a plan view (view from inside) of a first bracket and FIG. 4B is a side view of the first bracket.
Figure 4B:
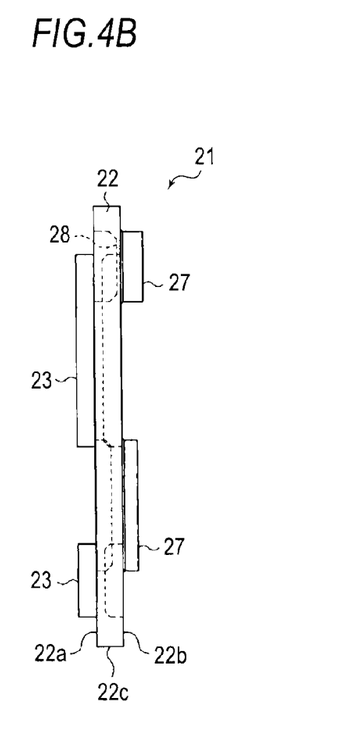

As illustrated in FIGS. 4A and 4B, the first bracket 21 has the main body portion 22 that has a disk shape, the three guide sections 23 that guide movements of the pawls 40A, 40B, and 40C, and convex portions 27 for mounting the first bracket 21 on a fixing member.

The guide sections 23 are disposed to protrude from an inner surface 22a of the main body portion 22.

The guide sections 23 have the guide surfaces 24 that extend outward and inner side surfaces 23a. The cam 50 is accommodated in an area that is surrounded by the inner side surfaces 23a of the three guide sections 23.

Two of the guide surfaces 24 that face each other in two of the guide sections 23 that are adjacent to each other are parallel to each other, and these guide surfaces 24 constitute a guide groove 26 in conjunction with the inner surface 22a of the main body portion 22. The guide grooves 26 guide the pawls 40A, 40B, and 40C to be moved in the radial direction.

The three guide sections 23 have the same shape and are arranged at equal angles in the circumferential direction. In other words, the three guide grooves 26 are arranged at equal angular intervals in the circumferential direction. The side opposite to the guide sections 23 (outer surface 22b side of the first bracket 21) is recessed to correspond to the guide sections 23.

The convex portions 27 are disposed to protrude from the surface on the side opposite to the respective guide grooves 26 (outer surface 22b of the main body portion 22). The side opposite to the convex portions 27 (inner surface 22a side of the first bracket 21) is recessed to correspond to the convex portions 27. One of the recessed portions that are configured to be on the side opposite to the convex portions 27 is used as an accommodating concave portion 28. The end portion 62a of the spiral spring 60 is accommodated in the accommodating concave portion 28.

When the first bracket 21 is mounted on the fixing member (for example, the plate 3a), the convex portions 27 are inserted into or engaged with holes or notches that are disposed in the fixing member. Then, the convex portions 27 and the fixing member are welded.

An accommodating portion 25 in which the spiral portion 61 of the spiral spring 60 is accommodated is disposed in a central portion of the main body portion 22.

The accommodating portion 25 is configured to penetrate the main body portion 22. The accommodating portion 25 has an accommodating main body portion 25a that accommodates the spiral portion 61 of the spiral spring 60 and an outer accommodating portion 25b that accommodates the extending portion 62b of the spiral spring 60. The outer accommodating portion 25b allows the accommodating portion 25 and the accommodating concave portion 28 to communicate with each other. The outer engagement portion 62 of the spiral spring 60 (refer to FIG. 10) is engaged from the outer accommodating portion 25b to the accommodating concave portion 28.

The first bracket 21 is formed by press working.

For example, the guide sections 23, a recessed structure on the side opposite to the guide sections 23, the convex portions 27, and a recessed structure on the side opposite to the convex portions 27 are formed with one mold set by press working of a metal plate.

The cover 70 that is mounted on the first bracket 21 has the following configuration.

The cover 70 (refer to FIG. 3) has the cover main body portion 71 that covers the accommodating main body portion 25a of the first bracket 21, a protruding portion 72 that covers the outer accommodating portion 25b, and an abutting portion 73 that is disposed from a circumferential edge of the cover main body portion 71 and is pressed against an inner circumferential surface 25c of the accommodating main body portion 25a.

The cover main body portion 71 has a substantially circular shape. A through-hole 71a into which the shaft 5 is inserted is disposed in a central portion of the cover main body portion 71.

The protruding portion 72 protrudes in the radial direction of the cover main body portion 71 from the circumferential edge of the cover main body portion 71. The abutting portion 73 is disposed along the circumferential edge of the cover main body portion 71 and to protrude perpendicularly to an outer surface of the cover main body portion 71.

A mounting structure for the cover 70 will be described with reference to FIGS. 5A and 5B.

Figure 5A:
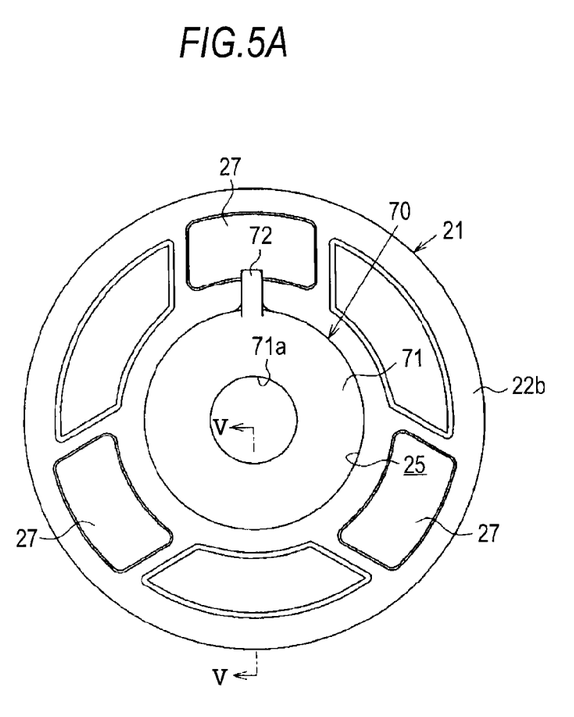
FIG. 5A is a plan view (view from outside) of the first bracket on which a cover is mounted and FIG. 5B is a cross-sectional view taken along line V-V in FIG. 5A.

FIG. 5A is a plan view, seen from the outer surface 22b side, of the first bracket 21 on which the cover 70 is mounted. FIG. 5B is a cross-sectional view of the first bracket 21 taken along line V-V in FIG. 5A.

The cover 70 is mounted on the accommodating portion 25 of the first bracket 21 by press-fitting. When the cover 70 is mounted on the first bracket 21, the abutting portion 73 is pressed against the inner circumferential surface 25c of the accommodating main body portion 25a of the first bracket 21.

As illustrated in FIG. 5A, substantially the entire spiral spring 60 is covered by the cover 70 when the cover 70 is mounted on the accommodating portion 25 of the first bracket 21. The spiral portion 61 of the spiral spring 60 is covered by the cover main body portion 71 and the extending portion 62b of the spiral spring 60 is covered by the protruding portion 72 of the cover 70.

Figure 5B:
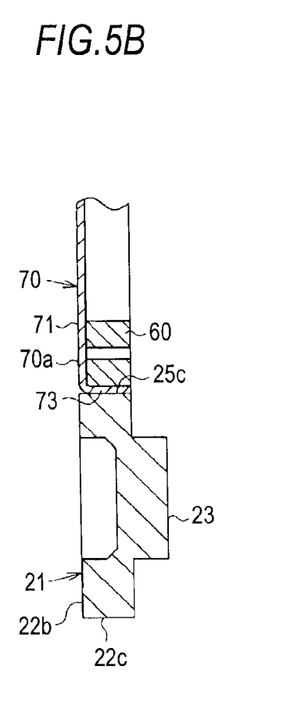

As illustrated in FIG. 5B, the outer surface 70a of the cover 70 corresponds to the outer surface 22b of the first bracket 21 or is positioned inside the outer surface 22b of the first bracket 21 in a state where the cover 70 is mounted on the accommodating portion 25 of the first bracket 21. In other words, the cover 70 is mounted on the first bracket 21 not to protrude from the outer surface 22b of the first bracket 21.

The second bracket 31 will be described with reference to FIGS. 6A and 6B.

Figure 6A:
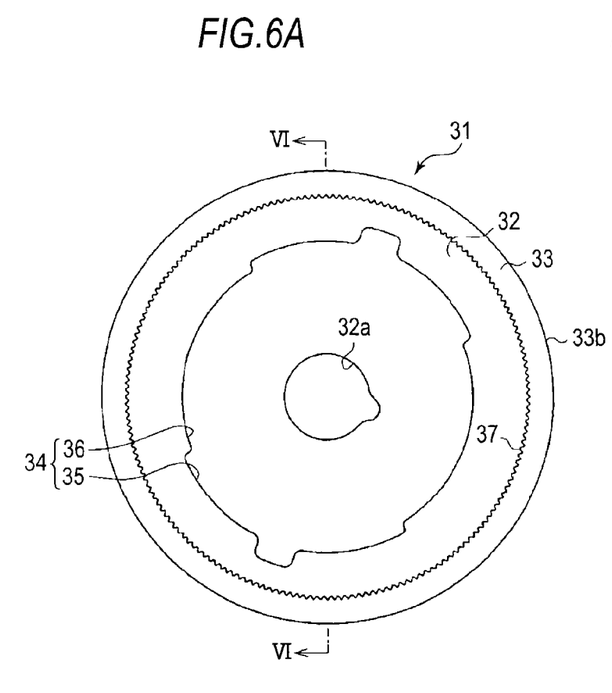
FIG. 6A is a plan view of a second bracket and FIG. 6B is a cross-sectional view taken along line VI-VI in FIG. 6A.
Figure 6B:
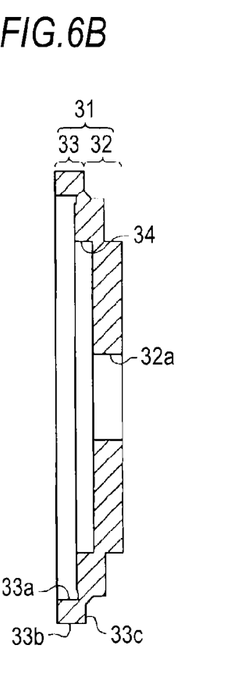

As illustrated in FIGS. 6A and 6B, the second bracket 31 has a disk-shaped main body portion 32 that has an insertion hole 32a into which the shaft 5 is inserted and an outer circumferential wall 33 that is disposed along an outer edge of the main body portion 32.

The internal teeth 37 that are engaged with the external teeth 43A to external teeth 43C of the first to third pawls 40A to 40C are disposed, over the entire circumference, on an inner circumferential surface 33a of the outer circumferential wall 33.

An outer circumferential surface 33b of the outer circumferential wall 33 is in sliding contact with the holding member 80. An outer surface 33c of the outer circumferential wall 33 is in sliding contact with a protrusion 83 of the holding member 80 (refer to FIG. 2).

A substantially circular concave portion 34 is disposed in a central portion of the main body portion 32.

The concave portion 34 has the outer circumferential portion 35 that has a circumferential surface which has a predetermined first radius and the inner circumferential portion 36 that has a circumferential surface which has a second radius smaller than the first radius. When the circumferential surface of the outer circumferential portion 35 is a reference plane, the inner circumferential portion 36 protrudes inwardly in the radial direction.

The outer circumferential portion 35 is configured for the limiting unit 46A of the first pawl 40A not to abut against the outer circumferential portion 35. In other words, the outer circumferential portion 35 is configured not to limit the outward movement of the first pawl 40A.

The inner circumferential portion 36 is configured for the limiting unit 46A of the first pawl 40A to abut against the inner circumferential portion 36 during the course of the movement of the first pawl 40A to an outermost side. In other words, the inner circumferential portion 36 limits the outward movement of the first pawl 40A so that the external teeth 43A of the first pawl 40A and the internal teeth 37 of the second bracket 31 are not engaged with each other.

Next, the holding member 80 will be described.

As illustrated in FIG. 3, the holding member 80 is provided with a main body portion 81 that has an annular shape and a flange portion 82 that extends from one circumferential edge of the main body portion 81 toward a center section of the main body portion 81. The protrusion 83 that protrudes toward an inner side (second bracket 31 side) is disposed in the flange portion 82. The play (margin) of the movement of the second bracket 31 in the axis of rotation C2 direction is adjusted by the protrusion 83.

The main body portion 81 of the holding member 80 covers an outer circumferential surface 22c of the first bracket 21 and the outer circumferential surface 33b of the second bracket 31. In addition, the main body portion 81 of the holding member 80 is laser-welded with the outer circumferential surface 22c of the first bracket 21. The flange portion 82 of the holding member 80 covers the outer surface 33c of the outer circumferential wall 33 of the second bracket 31 (refer to FIG. 2). In this manner, the holding member 80 holds the first bracket 21 and the second bracket 31 by maintaining a predetermined distance between the first bracket 21 and the second bracket 31 in the axis of rotation C2 direction.

An operation of the seat reclining device 20 will be described with reference to FIGS. 7A to 7C.

Figure 7A:
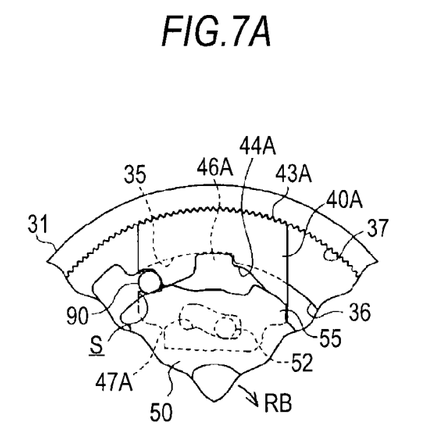
FIG. 7A is a schematic diagram illustrating a lock state.
Figure 7B:
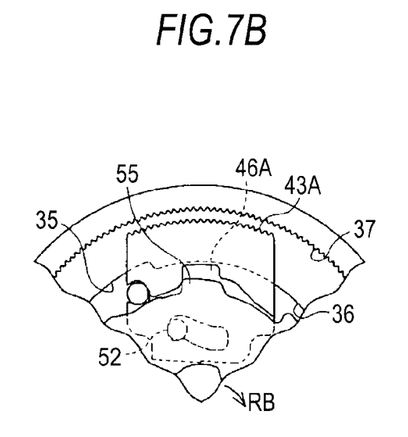
FIG. 7B is a schematic diagram illustrating an unlock state.
Figure 7C:
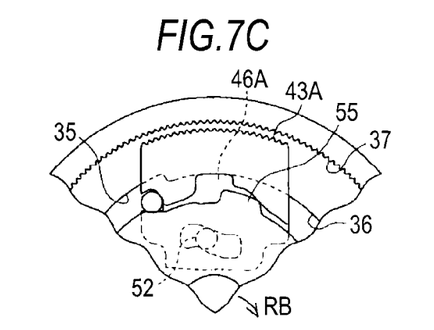
FIG. 7C is a schematic diagram illustrating a lock limit state.

FIGS. 7A to 7C are schematic cross-sectional diagrams taken along line VII-VII in FIG. 2. The guide sections 23 and the holding member 80 are not illustrated in FIGS. 7A to 7C.

FIG. 7A illustrates a state where the external teeth 43A to 43C of the respective pawls 40A to 40C and the internal teeth 37 of the second bracket 31 are engaged with each other (hereinafter, "lock state").

FIG. 7B illustrates a state where the external teeth 43A to 43C of the respective pawls 40A to 40C and the internal teeth 37 of the second bracket 31 are not engaged with each other because the respective pawls 40A to 40C are maintained at radially inward positions (hereinafter, "unlock state").

FIG. 7C illustrates a state where the external teeth 43A to 43C of the respective pawls 40A to 40C and the internal teeth 37 of the second bracket 31 are not engaged with each other because outward movement of the first pawl 40A is limited (hereinafter, "lock limit state").

Next, an operation of the cam mechanism in each of the states of the seat reclining device 20 will be described.

The lock state that is illustrated in FIG. 7A is the aspect of the seat reclining device 20 at a time when the seat back 4 is tilted at an angle within a predetermined range with respect to the seat cushion 3 and the operation lever 5a is not operated.

When the seat back 4 is tilted at an angle within a predetermined range with respect to the seat cushion 3, that is, when the outer circumferential portion 35 of the second bracket 31 is at a position corresponding to the limiting unit 46A of the first pawl 40A, the movement of the first pawl 40A in the radial direction is not limited.

When the operation lever 5a is not operated, that is, when a force in the direction opposite to the biasing direction RB is not applied to the cam 50, the biasing force that is applied to the cam 50 causes the cam 50 to rotate in the biasing direction RB, and thus the first to third cam portions 55 to 57 press the first to third cam surfaces 44A to 44C of the respective pawls 40A to 40C. As a result, the respective pawls 40A to 40C are pressed outwardly, and thus the external teeth 43A to 43C of the respective pawls 40A to 40C are engaged with the internal teeth 37 of the second bracket 31. In other words, the seat reclining device 20 is put into the lock state.

The unlock state that is illustrated in FIG. 7B is the aspect of the seat reclining device 20 at a time when the operation lever 5a is operated.

When the cam 50 is allowed to rotate in the direction opposite to the biasing direction RB by the operation of the operation lever 5a, the respective pawls 40A to 40C are moved radially inward, and thus the external teeth 43A to 43C of the respective pawls 40A to 40C and the internal teeth 37 of the second bracket 31 are separated from each other. In this manner, the seat reclining device 20 is put into the unlock state.

The lock limit state that is illustrated in FIG. 7C is the aspect of the seat reclining device 20 at a time when the seat back 4 is tilted at an angle out of a predetermined range with respect to the seat cushion 3 and the operation lever 5a is not operated.

When the seat back 4 is tilted at an angle out of a predetermined range with respect to the seat cushion 3, that is, when the inner circumferential portion 36 of the second bracket 31 is at a position corresponding to the limiting unit 46A of the first pawl 40A, the limiting unit 46A of the first pawl 40A abuts against the inner circumferential portion 36 of the second bracket 31, and thus the movement of the first pawl 40A in the radial direction is limited. Accordingly, the external teeth 43A to 43C of the respective pawls 40A to 40C and the internal teeth 37 of the second bracket 31 are separated from each other. In other words, the seat reclining device 20 is put into the lock limit state (state where the rotation of the second bracket 31 is allowed).

An example of a mounting structure for the seat reclining device 20 will be described with reference to FIG. 8.

Figure 8:
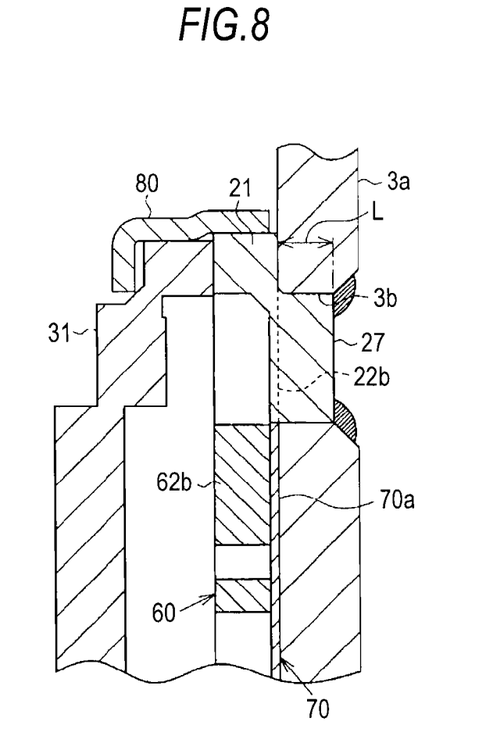
FIG. 8 is an enlarged view of a mounting portion of the seat reclining device that is mounted on a fixing member.

FIG. 8 is a cross-sectional view of a mounting portion of the seat reclining device 20 that is mounted on the plate 3a of the seat cushion 3.

In this mounting structure, the convex portion 27 of the seat reclining device 20 is inserted into a through-hole 3b that is disposed in the plate 3a of the seat cushion 3. Then, the seat reclining device 20 is mounted on the plate 3a with the outer surface 22b of the first bracket 21 being in contact with the plate 3a.

The seat reclining device 20 can be mounted in this manner because the outer surface 70a of the cover 70 is configured to correspond to the outer surface 22b of the first bracket 21 or to be positioned inside the outer surface 22b of the first bracket 21.

In the seat reclining device 20 of the related art, the cover 70 protrudes from the outer surface 22b of the first bracket 21, and thus the length (hereinafter, referred to as a "caught length L") of the part of the convex portion 27 that is caught by the plate 3a is shortened and the strength of the mounting structure may be deteriorated. However, in the seat reclining device 20 according to this embodiment, the outer surface 70a of the cover 70 corresponds to the outer surface 22b of the first bracket 21 or is positioned inside the outer surface 22b of the first bracket 21 and the cover 70 does not protrude from the outer surface 22b of the first bracket 21, and thus the caught length L is not shortened. Accordingly, the strength of the mounting structure for the seat reclining device 20 is unlikely to be deteriorated.

The seat reclining device 20 according to this embodiment described above achieves the following effects.

(1) If, for example, dust gets into the metal wire that constitutes the spiral spring 60 or dust accumulates between the spiral spring 60 and the accommodating portion 25, the movement of the spiral spring 60 is limited and the operation of the seat reclining device 20 is hindered. However, the seat reclining device 20 according to this embodiment is provided with the cover 70 that covers the spiral spring 60, and thus infiltration of dust into the accommodating portion 25 that accommodates the spiral spring 60 can be suppressed.

In addition, the outer surface 70a of the cover 70 corresponds to the outer surface 22b of the first bracket 21 or is positioned inside the outer surface 22b of the first bracket 21 (inside along the axis of rotation C2).

Accordingly, the cover does not interfere with the mounting of the first bracket 21 on the fixing member. In other words, the first bracket has a high level of mountability.

In addition, the cover 70 does not protrude from the outer surface 22b of the first bracket 21, and thus the outer surface 22b of the first bracket 21 can be brought into contact with the plate 3a (fixing member) of the seat cushion 3. In other words, a gap between the first bracket 21 and the plate 3a can be narrowed compared to a case where the cover 70 is mounted to protrude from the outer surface 22b of the first bracket 21.

(2) In the embodiment described above, the cover 70 has the abutting portion 73 that is pressed against the inner circumferential surface 25c of the accommodating main body portion 25a of the accommodating portion 25. According to this configuration, the cover 70 can be mounted by press-fitting, and thus the mounting of the cover 70 on the first bracket 21 is simplified.

(3) In the embodiment described above, the accommodating portion 25 has the accommodating main body portion 25a that accommodates the spiral portion 61 of the spiral spring 60 and the outer accommodating portion 25b that accommodates the extending portion 62b of the spiral spring 60. The cover 70 has the protruding portion 72 that covers the outer accommodating portion 25b. Accordingly, infiltration of dust from the outer accommodating portion 25b can be suppressed.

(4) In the embodiment described above, the first bracket 21 has the convex portions 27 for engagement with the fixing member (for example, plate 3a) on the outer surface 22b.

In other words, the seat reclining device 20 has the convex portions 27 for engagement with the fixing member and the outer surface 70a of the cover 70 corresponds to the outer surface 22b of the first bracket 21 or is positioned inside the outer surface 22b of the first bracket 21 (inside along the axis of rotation C2).

In this configuration in which the first bracket 21 is mounted on the fixing member via the convex portions 27, it is preferable to ensure the caught length L of the convex portion 27. The caught length is decreased in the structure of the related art, that is, in the structure in which the cover is disposed to protrude from the outer surface of the first bracket. However, in the seat reclining device 20 having the configuration described above, the cover 70 does not protrude from the outer surface 22b of the first bracket 21, and thus the caught length L is not decreased.

The embodiment described above can also be changed as follows.

In the embodiment described above, the abutting portion 73 of the cover 70 is disposed substantially across the entire circumferential edge of the cover main body portion 71. However, the abutting portion 73 may be disposed at a part of the circumferential edge.

Figure 9:
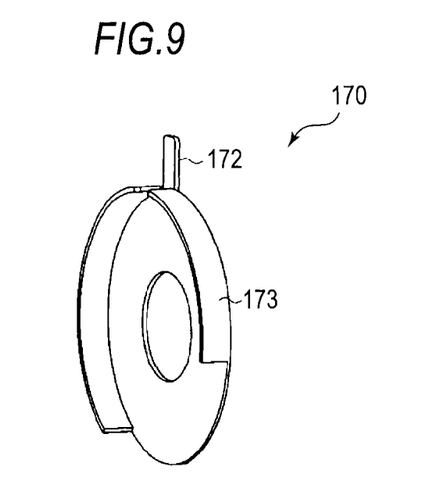
FIG. 9 is a perspective view of a cover according to a modification example.
Figure 10:
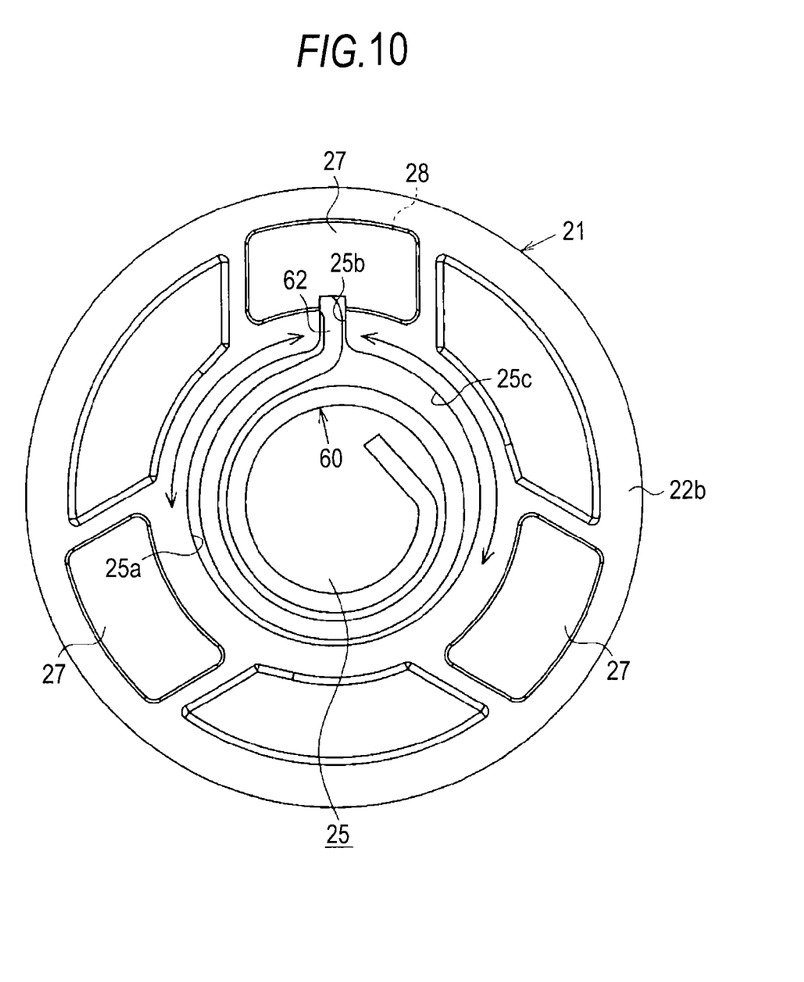
FIG. 10 is a plan view illustrating arrangement of an abutting portion of the cover according to the modification example with regard to the first bracket.

FIG. 9 illustrates a cover 170 according to a modification example. FIG. 10 is a view illustrating arrangement of an abutting portion 173.

In this cover 170, the abutting portion 73 is disposed at a part corresponding to a part (range illustrated by the arrow in FIG. 10) where a gap is made between the spiral portion 61 and the accommodating main body portion 25a of the accommodating portion 25 at the circumferential edge of the cover main body portion 71 in a case where the cover 170 is positioned for a protruding portion 172 to cover the outer accommodating portion 25b of the first bracket 21.

According to this configuration, the abutting portion 173 of the cover 170 is positioned at the part where the gap is made between the spiral portion 61 and the accommodating main body portion 25a of the accommodating portion 25 if the cover 170 is positioned for the protruding portion 172 of the cover 170 to cover the outer accommodating portion 25b of the first bracket 21. In a case where the protruding portion 172 is absent in the cover 170, the positioning of the cover 170 has to be performed visually and the operation becomes time-consuming. However, according to this configuration, the mounting of the cover 170 is facilitated without such troubles.

In the embodiment described above, the rear rotation direction RX of the second bracket 31 and the biasing direction RB of the cam 50 at a time when the seat back 4 falls to a rear side correspond to each other. However, these directions may also differ from each other. In other words, the rear rotation direction RX of the second bracket 31 and the biasing direction RB of the cam 50 at a time when the seat back 4 falls to a rear side may be configured to be opposite to each other.

In the embodiment described above, the three pawls 40A, 40B, and 40C are arranged in the first bracket 21. However, the number of the pawls is not limited. In a case where a plurality of the pawls are arranged, the pawls may have different shapes insofar as the pawls are configured to be operated in response to each other. Also, the pawls may have the same shape.

In the embodiment described above, the first bracket 21 is fixed to the seat cushion 3 side and the second bracket 31 is fixed to the seat back 4 side. However, this fixing relationship may be the other way around. In other words, the first bracket 21 may be fixed to the seat back 4 side and the second bracket 31 may be fixed to the seat cushion 3 side.

A seat reclining device according to an aspect of this disclosure includes a first bracket that has an accommodating portion which is open to an outer side of a seat in a width direction, a second bracket that rotates with respect to the first bracket, a cam that rotates with respect to the first bracket, a spring that is accommodated in the accommodating portion of the first bracket and biases the cam, a pawl that is moved in a radial direction of the first bracket based on the rotation of the cam and is engaged with the second bracket, and a cover that covers the spring, in which the cover is mounted on the accommodating portion and an outer surface of the cover on the outer side of the seat in the width direction corresponds to an outer surface of the first bracket on the outer side of the seat in the width direction or is positioned inside the outer surface of the first bracket in the width direction of the seat.

According to this configuration, the outer surface of the cover corresponds to the outer surface of the first bracket or is positioned inside the outer surface of the first bracket, and thus the cover does not interfere with mounting of the first bracket on a fixing member. In other words, the first bracket has a high level of mountability.

In the seat reclining device described above, the cover may include an abutting portion that is pressed against an inner circumferential surface of the accommodating portion. According to this configuration, the cover can be mounted by press-fitting, and thus mounting of the cover on the first bracket is simplified.

In the seat reclining device described above, the spring may be a spiral spring that has a spiral portion and an extending portion which extends radially outward from the spiral portion, the accommodating portion may have an accommodating main body portion that accommodates the spiral portion and an outer accommodating portion that accommodates the extending portion, and the cover may include a protruding portion that covers the outer accommodating portion. According to this configuration, infiltration of dust from the outer accommodating portion can be suppressed.

In the seat reclining device described above, the abutting portion may be disposed at a part corresponding to a part where a gap is made between the spiral portion of the spring and the accommodating main body portion of the accommodating portion in a case where the cover is positioned for the protruding portion to cover the outer accommodating portion.

According to this configuration, the abutting portion of the cover is positioned at the part where the gap is made between the spiral portion of the spring and the accommodating main body portion of the accommodating portion if the cover is positioned for the protruding portion of the cover to cover the outer accommodating portion of the first bracket. In a case where the protruding portion is absent in the cover, the positioning of the cover has to be performed visually and the operation becomes time-consuming. However, according to this configuration, the mounting of the cover is facilitated without such troubles.

In the seat reclining device described above, the first bracket may be mounted on a fixing member and a convex portion for engagement with the fixing member may be disposed on the outer surface of the first bracket.

In other words, this seat reclining device has the convex portion for engagement with the fixing member and the outer surface of the cover corresponds to the outer surface of the first bracket or is positioned inside the outer surface of the first bracket.

In a configuration in which the first bracket is mounted on the fixing member via the convex portion, it is preferable to ensure a caught length of the convex portion. The caught length is decreased in the structure of the related art, that is, in the structure in which the cover is disposed to protrude from the outer surface of the first bracket. However, in the seat reclining device having the configuration described above, the cover does not protrude from the outer surface of the first bracket, and thus the caught length is not decreased.

The seat reclining device having the configuration described above has a high level of bracket mountability.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat reclining device comprising:
   a first bracket that includes an accommodating portion which is open to an outer side of a seat in a width direction;
   a second bracket that rotates with respect to the first bracket;
   a cam that rotates with respect to the first bracket;
   a spring that is accommodated in the accommodating portion of the first bracket and biases the cam;
   a pawl that is moved in a radial direction of the first bracket based on a rotation of the cam and is engaged with the second bracket; and
   a cover that covers the spring,
   wherein the cover is mounted on the accommodating portion and an outermost surface of the cover on the outer side of the seat in the width direction is flush with an outer surface of the first bracket on the outer side of the seat in the width direction or is positioned axially inside relative to the outer surface of the first bracket in the width direction of the seat, and
   wherein the first bracket includes a convex portion configured to engage with a fixing member, the convex portion being formed on the outer surface of the first bracket.

2. The seat reclining device according to claim 1, wherein the convex portion is fittingly engaged with the fixing member.

3. The seat reclining device according to claim 1, wherein the outermost surface of the cover on the outer side of the seat in the width direction is flush with the outer surface of the first bracket on the outer side of the seat in the width direction.

4. The seat reclining device according to claim 1, wherein the outermost surface of the cover on the outer side of the seat in the width direction is positioned recessed relative to the outer surface of the first bracket in the width direction of the seat.

5. The seat reclining device according to claim 1, wherein the cover includes an abutting portion that is pressed against an inner circumferential surface of the accommodating portion.

6. The seat reclining device according to claim 5, wherein the spring is a spiral spring that includes a spiral portion and an extending portion which extends radially outward from the spiral portion,
   wherein the accommodating portion has an accommodating main body portion that accommodates the spiral portion and an outer accommodating portion that accommodates the extending portion, and
   wherein the cover includes a protruding portion that covers the outer accommodating portion.

7. The seat reclining device according to claim 6, wherein the abutting portion is disposed at a part corresponding to a part where a gap is made between the spiral portion of the spring and the accommodating main body portion of the accommodating portion in a case where the cover is positioned for the protruding portion to cover the outer accommodating portion.

8. The seat reclining device according to claim 6, wherein the spiral portion is accommodated in the accommodation portion radially inward of the accommodating main body and in contact with an inner peripheral surface of the accommodating main body.

9. A seat reclining device comprising:
a first bracket that includes an accommodating portion which is open to an outer side of a seat in a width direction;
a second bracket that rotates with respect to the first bracket;
a cam that rotates with respect to the first bracket;
a spring that is accommodated in the accommodating portion of the first bracket and biases the cam;
a pawl that is moved in a radial direction of the first bracket based on a rotation of the cam and is engaged with the second bracket; and
a cover that covers the spring,
wherein the cover is mounted on the accommodating portion and an outer surface of the cover on the outer side of the seat in the width direction is flush with an outer surface of the first bracket on the outer side of the seat in the width direction and is positioned axially recessed relative to the outer surface of the first bracket in the width direction of the seat, and
wherein the first bracket includes a convex portion configured to engage with a fixing member, the convex portion being formed on the outer surface of the first bracket.

* * * * *